United States Patent

[11] 3,619,742

[72] Inventor Stanley E. Rud, Jr.
Hopkins, Minn.
[21] Appl. No. 39,336
[22] Filed May 21, 1970
[45] Patented Nov. 9, 1971
[73] Assignee Rosemount Engineering Company
Eden Prairie, Minn.

[54] SHIELDED CAPACITANCE PRESSURE SENSOR
19 Claims, 6 Drawing Figs.
[52] U.S. Cl..................................................... 317/246,
29/25.42, 73/398 C
[51] Int. Cl..................................................... H01g 7/00
[50] Field of Search........................................ 317/246;
1/261; 29/25.42; 73/398 C

[56] References Cited
UNITED STATES PATENTS
3,195,028 7/1965 Werner ..................... 317/246
Primary Examiner—E. A. Goldberg
Attorney—Dugger, Peterson, Johnson & Westman ABSTRACT: A capacitance-type pressure sensor having a reference capacitor plate and embodying a shield surrounding the lead wire and reference plate support assembly and maintained at substantially the same potential as the lead wire and reference plate. The shield extends substantially coplanar with the reference capacitor plate so that errors due to shunt capacitances are eliminated.

PATENTED NOV 9 1971

INVENTOR.
STANLEY E. RUD JR.
BY
Dugger, Peterson, Johnson, & Westman
ATTORNEYS

INVENTOR.
STANLEY E. RUD, JR.
BY
Dugger, Peterson, Johnson & Westman
ATTORNEYS

SHIELDED CAPACITANCE PRESSURE SENSOR

BACKGROUND OF THE INVENTION

1. Field of the Invention

The present invention relates to shielded capacitance pressure sensors.

2. Prior Art

Capacitance pressure sensors, such as that shown in U.S. Pat. No. 3,195,028, for example, are widely used throughout industry. One of the problems of capacitance pressure sensors has been the shunting of current from the sensing capacitive plate and lead wires to ground. This is particularly true where the diaphragm and sensor case are grounded.

U.S. Pat. No. 3,027,769 shows a pressure sensor using a shielded lead wire, but there is no shielding on the mounting structure for the reference electrode in the sensor itself. The shunt currents in the mounting block for the reference electrode can reach significant levels.

Complete shielding in the mounting block for the reference capacitor electrode or plate requires solving the construction problems associated with positioning and holding a shield in place while providing a reliable electrode mount.

SUMMARY OF THE INVENTION

The present invention relates to a capacitance pressure sensor utilizing a shield to minimize effects of shunt capacitance changes which affect precise readings. The structure is adapted for utilization of very small sensors and encompasses a unique configuration for supporting the capacitor reference plate or electrode whereby the entire electrical lead wire assembly leading to the reference electrode is electrically shielded right up to and surrounding the edges of the reference capacitor electrode itself. The shield thus extends into the interior of the pressure sensor. The reference electrode supporting structure, which may be an insulating material such as alumina, is made in three parts. The shield extends through the support member and surrounds the periphery of the reference electrode. The shield is maintained at substantially the same potential as the lead wire and reference electrode so that shunt currents are negligible.

DESCRIPTION OF THE PREFERRED EMBODIMENT

Figure 1:
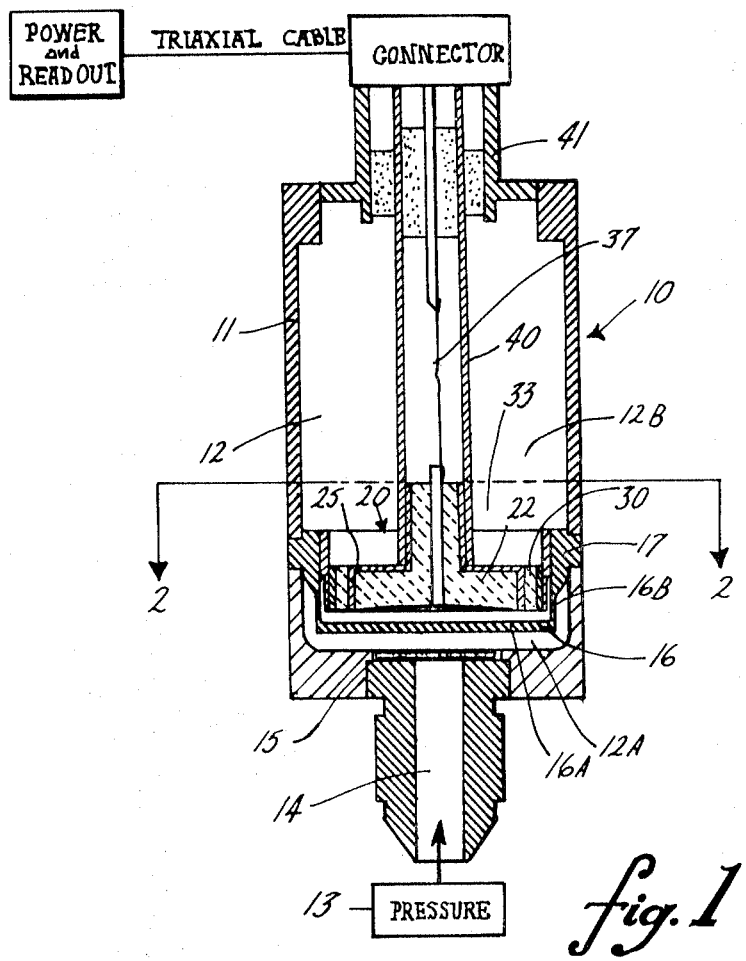
FIG. 1 is a vertical sectional view of a capacitance pressure sensor made according to the present invention.
Figure 2:
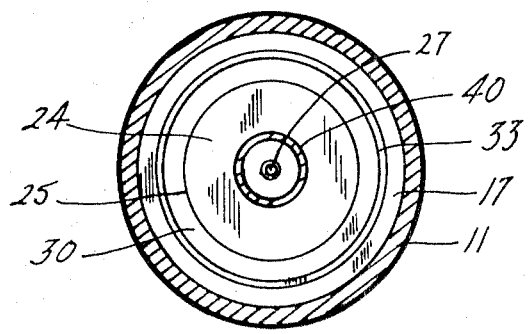
FIG. 2 is a sectional view taken as on line 2—2 in FIG. 1.

A pressure sensor illustrated generally at 10 comprises an outer housing or body 11 having an interior chamber illustrated generally at 12. The body is made up in several sections for ease of assembly and is used for sensing pressure coming from a source 13 through a fitting 14 forming a fluid-flow passageway. The fitting 14 fits into the lower portion of the housing or case, as shown in FIG. 1, and a filter 15 can be utilized for filtering the fluid under pressure being introduced into the sensor.

The interior chamber 12 is divided into a sensing chamber 12A and a reference chamber 12B. The sensing chamber is divided from the reference chamber with a diaphragm illustrated generally at 16. The diaphragm, as shown is a free edge supported diaphragm substantially similar to that shown in U.S. Pat. No. 3,195,0238, The diaphragm has a main plate 16A, and an annular, thin walled tubular support 16B along its peripheral edge. The thin wall support 16B joins a massive ring section 17 which is also tubular, and which fits between sections of the outer case 11 and is welded into place during assembly.

Figure 3:
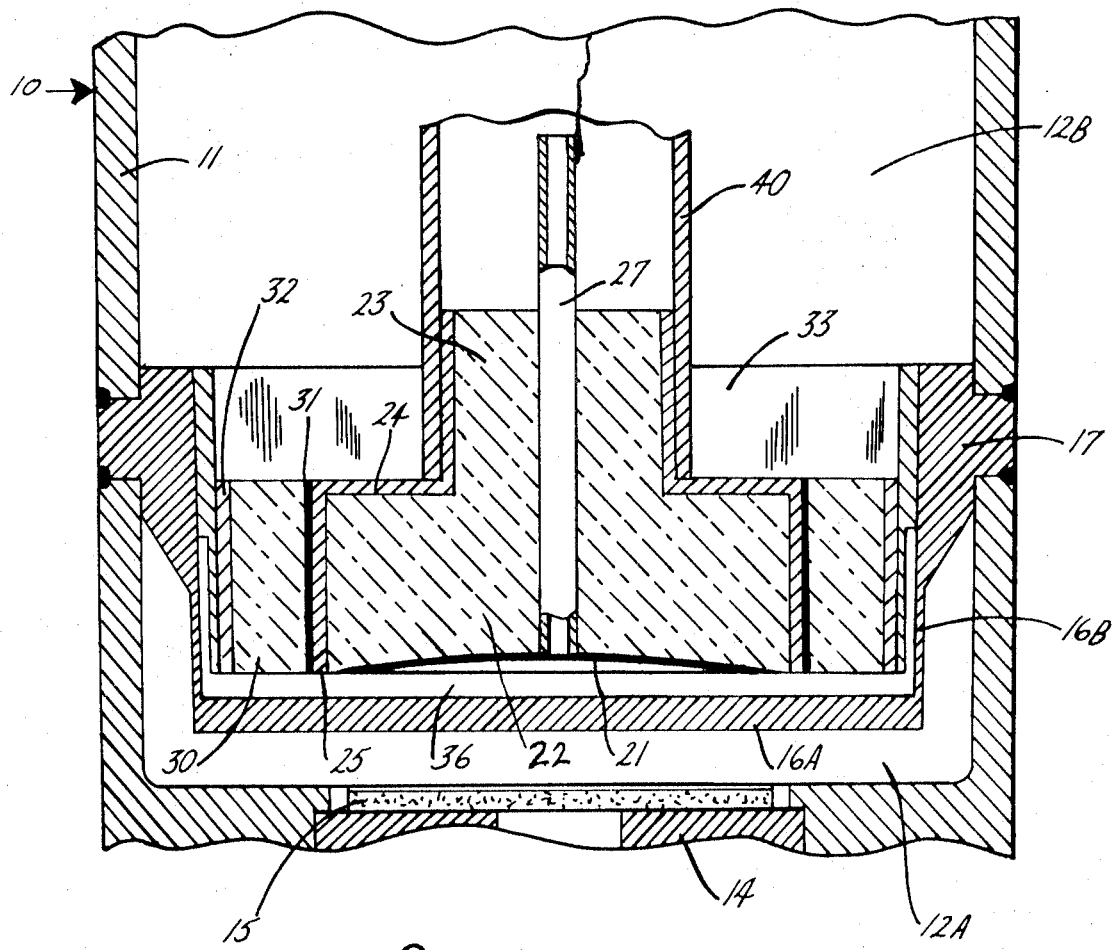
FIG. 3 is an enlarged side sectional view of the sensing capacitor plate and diaphragm member of the pressure sensor of FIG. 1.

The tubular support 16B and plate 16A can be machined from a single block or can be made by brazing or welding the plate and tube if desired. The diaphragm is at the same electrical potential as the sensor case, and is usually at ground potential. A reference capacitor electrode assembly is illustrated generally at 20. This is more clearly shown in FIG. 3. The reference capacitor electrode or plate 21 is mounted onto a cylindrical block 22 of a ceramic material which is circular in cross section and has an upwardly extending neck 23. The ceramic material may be alumina and for example, 94 percent alumina ceramic material has been found to be very satisfactory. The ceramic block 22 is metallized along its outer peripheral edge with a metal layer 25. The neck 23 also is metallized. This metallizing forms a very thin coat of metal on the ceramic material. The layers are shown enlarged in cross section for sake of clarity. The metallizing may be done by sputtering, vacuum depositing or other desired techniques. The metal selected has to be a good electrical conductor. The capacitor electrode 21 is mounted by deposition or other means on block 22 and as shown in exaggerated scale is formed on a part spherical seat curved to closely match diaphragm deflection characteristics. A tubular lead 27 is embedded in block 22 and extends therethrough. The lead is electrically connected to electrode 21. The capacitor electrode 21 consists of a thin conductive film on the surface of block 22 which is shown as a curved surface in greatly exaggerated scale. The curved surface preferably has the same shape that the pressure deflected diaphragm would have at that position in its travel. This shape provides a "simplified" relation between capacitance and pressure in addition to providing a back up surface to support the diaphragm from excessive stress under over pressure conditions. The capacitance-pressure relation with a properly curved surface may be expressed as:

$$C_p - C_o = \frac{K_1 P}{1 - K_2 P}$$

where $P$ is pressure differential across the diaphragm, $C_P$ is capacitance at pressure $P$, $C_o$ is capacitance at zero pressure differential and $K_1$ and $K_2$ are constants which represent spring constant and size of the diaphragm and size and dielectric characteristics of the capacitance.

The metal coating or layer 25 surrounding the inner block 22, and also the coating or layer 24 forms a part of an electrical shield surrounding electrode 21, and tubular lead 27. Note that electrode 21 is insulated from metal layer 25.

A ring 30 of ceramic material identical to that of the block 22, for example 94 percent alumina, is placed around the center block 22 on the outside of the metal layer 25. The metal layer 25 and the interior of the outer ring 30 are fastened together securely with a brazed layer 31. A tubular member 32 made of an alloy of iron and nickel, for example the alloy sold under the trademark "KOVAR" by the Westinghouse Electric Company, Pittsburgh, Pennsylvania, is placed around the outer surface of the ring 30 and is brazed into place. "KOVAR" is used because it has thermal expansion characteristics compatible with alumina.

Figure 4:
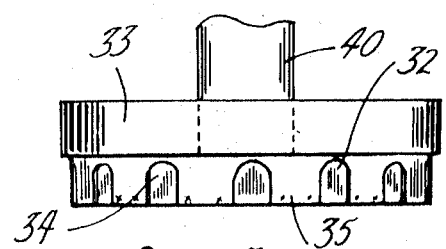
FIG. 4 is a fragmentary side elevational view showing of the supporting structure for mounting the reference capacitor plate in the sensor of the present invention.

Then, an outer mounting tube 33 is placed over the ring 32. The tube 33, as shown in FIG. 4, has relief notches 34 around the lower periphery thereof forming small tabs 35. The lower portions of the tabs 35 are spot welded onto the outer periphery of the KOVAR ring 32 at the lower portions of the mounting block assembly. The tabs 35 will bend slightly for a good fit. Then the upper part of the tube 33 is welded to the support 17 for the free edge diaphragm, so the entire diaphragm-capacitor plate assembly is installed as a unit into the outer case 11 for the pressure sensor. The weld seals the ring and diaphragm support structure.

The chamber 12A is thereby sealed from the chamber 12B. Tubular lead member 27 opens into a small chamber 36 formed between the upper surface of the diaphragm plate 16, and the lower surface of the electrode 22, and the mounting assembly for the electrode. It should be noted that the lower portions of the tube 33 are spaced away from the inner surfaces of the diaphragm edge support wall 16B. The chamber 12B is evacuated for a reference chamber, and this vacuum is also, as shown, applied to the chamber 36 via the tube 27. If desired the chamber 12B may be vented to atmosphere for "gage" pressure measurements or alternately to a second source of pressure if differential measurements are to be made between two sources of pressure.

The lead tube 27 extends out of the neck 23 and a suitable electrical lead 37 is attached thereto in a usual manner. The lead 37 has a flexible wire section attached to tube 27 and the wire extends to a connector pin. A shield tube 40, which is a metal tubular member, is slipped over the neck 23, and is made to come into electrical contact with metal layer 24 and the metal layer surrounding the neck 23 so that there is electrical contact between the tube 40 and the metal layers 24 and 25. The tube 40 extends up to a connector 41 and in conjunction with the metal layers 24 and 25 forms a continuous shield assembly 44 that terminates at the bottom of the mounting block for the capacitor plate 21. It can be seen that the edges of the shield are substantially flush with the capacitor plate 21 used as a reference or stationary capacitor electrode in the pressure sensor.

As shown in FIG. 1, the lead 37 extends upwardly into a connector portion illustrated at 41 which can have suitable connector attaching means on the outside thereof so that a conventional triaxial cable can be attached to the portion 41. The center of the triaxial cable electrically connects to the center lead 37, which carries signals from the plate 21, and an interior metal shield in the triaxial electrically connects to the tube 40. An outer metal sheath of the triaxial cable is connected to the outer casing 11. The outer sheath of the triaxial cable is thus at ground potential.

The triaxial lead wire connects to a power source and sensing equipment. The center lead, the shield, and the outer sheath are all insulated from each other.

The tube 40 may have openings in it so that the vacuum on the inside of the chamber 12B will communicate through tube 27 to the chamber 36.

The shield tube 40 is made very flexible so that assembly operation and temperature expansion differentials between the outer case and the tube itself will not cause the tube to exert substantial force on the mounting assembly 20 for the capacitor electrode. This can be done with an annular accordion type of fold in the tube or the tube can just be made of braided construction. Further, it is possible to simply use a sliding connection between the outer surface of the neck 23 and the inner surface of tube 40.

Figure 5:
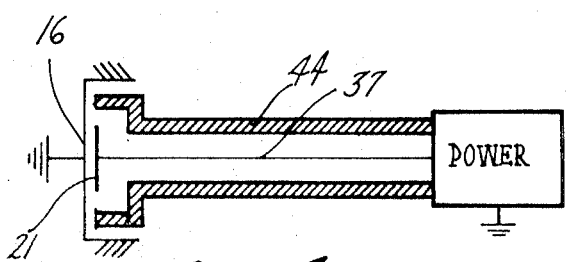
FIG. 5 is a schematic representation of the shielded capacitance sensor of FIG. 1.

This shield assembly 44 extends inside the sensor housing and electrically shields all of the electrical components so that even the capacitor electrode 21 itself is shielded. The shield is preferably kept at the same potential as the capacitor plate and its lead wires so that there will be no shunt current causing errors in reading. Errors due to changing shunt conditions have been a serious problem particularly where extremely high temperatures are encountered because the shunt currents will get much higher at higher temperatures with ordinary insulating materials and cannot be adequately compensated for. This problem is substantially eliminated by the present invention. The schematic representation in FIG. 5 shows the shield in place from power to the reference capacitor electrode.

A stretched membrane type sensing diaphragm can be substituted in place of the free edge supported diaphragm shown. The selection of the diaphragm depends in part upon the pressure ranges being sensed.

The construction of the mounting blocks for the sensing capacitor plate is new because of the multiple piece ceramic-metal construction which provides an insulated guard shield extending to the plane of the reference electrode. The interior block 22 is first formed, then the metallizing step is performed, to form the shield. Then the outer ring of ceramic material is brazed to the outer surfaces of the metallized layer on ceramic block 22. The outer metal tube is then brazed on and is utilized for mounting the center block to its support ring 33. The ring 33 can be welded or otherwise attached to the support structure 17 for the diaphragm.

This construction gives a very rugged sensor that is stable. The mounting for the reference capacitor plate or electrode 21 provides a highly stable structure. The use of KOVAR minimizes thermal stresses because the coefficient of expansion of KOVAR and the alumina ceramic material are closely matched.

The method of metallizing and then brazing on an outer ring of alumina permits complete shielding right up to and surrounding the capacitor plate.

Figure 6:
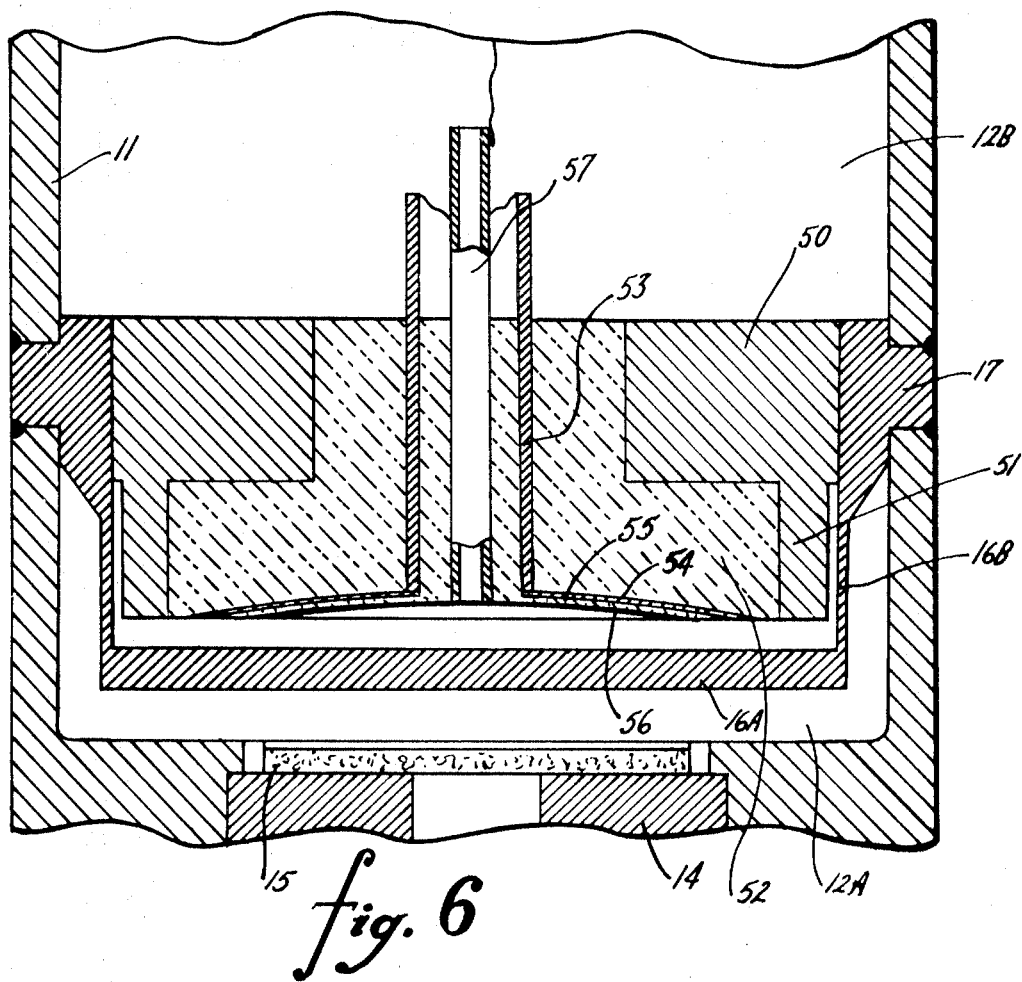
FIG. 6 is a sectional view of a modified form of the shield of the invention.

In FIG. 6 a modified construction of the shield and reference electrode mounting is shown. The outer case and diaphragm, as well as pressure guard and the like are the same as in the previous form. The mounting block 50 as shown is attached to massive ring 17 and includes a metal cup 51 filled with a ceramic material or glass to form a block shown at 52.

The shield tube 53, which corresponds to tube 40 is embedded in the glass block and extends through the block to a position where it is electrically connected to a metal shield layer 54 that is deposited onto a concave surface of the block facing diaphragm 16A. The shield layer 54 extends down to the outer surface of the block.

A thin layer of ceramic or glass 55 is then deposited over the outer surface of the metal shield layer and forms an insulation layer over the shield layer 54.

Then a reference capacitor plate 56 formed by a thin layer of metal is in turn deposited onto the glass layer 55. The capacitor plate 56 corresponds to capacitor plate 21 of the first form of the invention.

Capacitor plate 56 is also concave and is electrically connected to a lead tube 57 which corresponds to lead tube 27 in the first form of the invention. The lead tube and the reference capacitor plate 56 again are fully shielded, including where the lead passes through the support block for the reference capacitor plate. The shield layer 54, glass layer 55 and capacitor plate 56 can all be sputtered in place, or other depositing techniques may be used. The sensor operates as previously described.

The tubes 57 and 53 are put in place when the block 52 is formed. Thus the tubes 57 and 53 are held solidly in place. The concave surface, which is shown greatly exaggerated in scale for convenience of illustration, is ground in to match diaphragm deflection. The shield layer 54, the glass or ceramic layer 55 and capacitor plate 56 are then deposited in place. The capacitor plate 56, of course, is insulated from the shield layer 54. The shield layer 54 is insulated from the cup member 51. The connections are the same as before, with a triaxial cable carrying power to the sensor.

In both forms of the invention full shielding up to and surrounding the reference capacitor plate results in accurate results even in high-temperature operations. Also, in both forms of the invention the capacitor plate can be flat.

What is claimed is:

1. A pressure sensor of the capacitance type comprising a housing, electrode means in said housing, means to introduce pressure into said housing whereby said electrode means change in capacitance, lead wire means, power means supplying an electric potential to at least one of said electrode means through said lead wire means, and electrical shield means within said housing surrounding said lead wire means and at least portions of said one electrode means in said housing, said electrical shield means being insulated from said housing and from said electrode means.

2. The combination as specified in claim 1 wherein said shield means of said one electrode means is spaced from the other electrode means a distance substantially equal to the spacing between said electrode means.

3. The combination as specified in claim 1 wherein said one electrode means comprises a reference electrode, and the other of said electrode means comprises a diaphragm deflectable in response to pressure differentials thereon.

4. The combination as specified in claim 3 and means to mount said one electrode means with respect to said housing comprising a mounting block mounting said one electrode means, said mounting block being made of an insulating material, a portion of said electrical shield comprising an annular electrically conductive material embedded in said mounting block and spaced from said housing.

5. The combination as specified in claim 4 wherein said shield further includes a tubular member extending from said mounting block and surrounding said lead wire means, said tubular member extending to an external connection means on said housing.

6. The combination as specified in claim 3 wherein said reference electrode comprises a concave surface means formed to match the general deflection configuration of the diaphragm under pressure.

7. The combination as specified in claim 1 further characterized in that said shield means comprises a layer of shielding material deposited at least partially onto a surface of said mounting block facing the other electrode means, a layer of insulating material overlying said layer of shielding material, and wherein said one electrode is formed over the surface of said insulating layer.

8. The combination as specified in claim 1 wherein the shield means adjacent said one electrode is formed into the same general shape as said electrode at least at the outer peripheral portions thereof and a layer of insulating material separating the shield means from said one electrode.

9. A shielded mounting member for a capacitor plate for use in a pressure sensor comprising a mounting block, said block being made of a refractory type insulating material, capacitor plate means mounted on one face of said block, said block having a peripheral edge surface, a layer of metal on said peripheral edge surface, said metal layer forming a continuous shield surrounding said capacitor plate, lead wire means leading from said capacitor plate means and being surrounded by said peripheral surface, an outer ring of insulating material fixed to the said metal layer, and means to support said outer ring of insulating material with respect to said pressure sensor in a desired position.

10. The combination as specified in claim 9 wherein said block is circular in cross section, and said outer ring is an annular ring surrounding said metal layer and joined thereto.

11. The combination as specified in claim 10 wherein said block includes a neck member, and a tubular shield member surrounding said neck member and being electrically connected to said metal layer of said block, said tubular shield member being maintained at substantially the same potential as said lead wire means.

12. The device of claim 9 and electrical shield means surrounding said lead wire means and electrically connected to said metal layer, and means to maintain said capacitor plate and said shield means and metal layer at substantially the same electrical potential.

13. A mounting block for a reference capacitor plate in a capacitive pressure sensor comprising a substantially cylindrical center member of a refractory material, means on an end surface of said center member defining a capacitor plate, lead wire means extending through said center member and electrically connected to the capacitor plate, a layer of metallic material on the outer peripheral edge surfaces of said center member insulated from and substantially surrounding the edges of said capacitor plate, an outer peripheral member of insulating material fixed to said layer of metallic material, means attached to said outer member for mounting said capacitor plate in the desired position, and electrical shield means surrounding said lead wire electrically connected to said layer of metallic material to provide an electrical shield for said capacitor plate.

14. The combination as specified in claim 13 and housing means, said center member being mounted in said housing means, a diaphragm dividing said housing means into two separate chambers, said diaphragm being positioned in relationship to said capacitor plate so deflections of said diaphragm will cause a change in capacitance between said capacitor plate and said diaphragm.

15. The sensor of claim 13 and means to maintain said shield means and said capacitor plate at substantially the same electrical potential, said housing being at ground potential.

16. The combination as specified in claim 14 wherein said capacitor plate is curved to closely match the curvature of said diaphragm as said diaphragm deflects, whereby the relationship between capacitance and pressure may be described as:

$$C_p - C_o = \frac{K_1 P}{1 - K_2 P}$$

where $P$ is differential pressure across the diaphragm, $C_P$ is capacitance at pressure $P$, $C_o$ is capacitance at zero pressure differential and $K_1$ and $K_2$ are constants.

17. A method of constructing a mounting block for a shielded capacitor plate in a capacitance pressure sensor comprising the steps of:
forming a capacitor plate on one surface of said mounting block, depositing a metal layer on a peripheral surface of said mounting block surrounding said capacitor plate, placing a ring of insulating material around the outer surface of said metal layer, securing said ring to said metal layer, and mounting said outer ring to said pressure sensor.

18. The method as specified in claim 17 including the further step of placing an outer metal ring around said outer ring of insulating material, securing said outer metal ring in place to the outer surface of said ring of insulating material, and fixing a metal mounting ring to said outer metal ring before positioning said mounting block in a pressure sensor.

19. The method of claim 18 wherein the securing s comprise brazing the parts together.

* * * * *

PO-1050
(5/69)

UNITED STATES PATENT OFFICE
CERTIFICATE OF CORRECTION

Patent No. 3,619,742   Dated November 9, 1971

Inventor(s) Stanley E. Rud, Jr.

It is certified that error appears in the above-identified patent and that said Letters Patent are hereby corrected as shown below:

Column 4, line 20, "guard" should be --inlet--; line 52, "lager" should be --layer--. Column 6, line 54, "s" should be --steps--.

Signed and sealed this 18th day of April 1972.

(SEAL)
Attest:

EDWARD M. FLETCHER, JR.    ROBERT GOTTSCHALK
Attesting Officer          Commissioner of Patents